United States Patent [19]

Little

[11] 4,187,578
[45] Feb. 12, 1980

[54] CASTER BRACKET AND METHOD OF FORMING SAME

[75] Inventor: Carl H. Little, Jamestown, N.Y.

[73] Assignee: Weber-Knapp Company, Jamestown, N.Y.

[21] Appl. No.: 916,132

[22] Filed: Jun. 16, 1978

[51] Int. Cl.² .............................................. B60B 33/00
[52] U.S. Cl. .................. 16/29; 16/DIG. 42; 29/150; 248/188.7; 248/188.8
[58] Field of Search ................ 16/29, 30, 31 R, 31 A, 16/DIG. 42; 29/150; 248/220.1, 247, 248, 300, 301, 188.1, 188.2, 188.3, 188.4, 188.5, 188.6, 188.7, 188.8

[56] References Cited

U.S. PATENT DOCUMENTS

| 1,758,000 | 5/1930 | Herold | 16/29 |
| 2,130,245 | 9/1938 | Noelting | 16/29 |
| 3,639,942 | 2/1972 | Ostrom | 16/29 |

FOREIGN PATENT DOCUMENTS 939462  1/1974  Canada ................................... 16/31 A

*Primary Examiner*—C. J. Husar
*Assistant Examiner*—Moshe I. Cohen
*Attorney, Agent, or Firm*—Bean, Kauffman & Bean

[57] ABSTRACT

A caster bracket is fabricated from a single flat metal plate deformed to define a caster stud receiving curl; a pair of side plates and a connecting plate. The side plates are formed integrally with the connecting plate and are arranged in an essentially right angular relationship relative to both each other and the connecting plate, whereas the curl is defined by curling an extension plate formed integrally with one of the side plates. Preferably, fabrication is completed by bonding a free edge of the curl to its associated side plate and by bonding a free edge of the other side plate to the curl.

3 Claims, 6 Drawing Figures

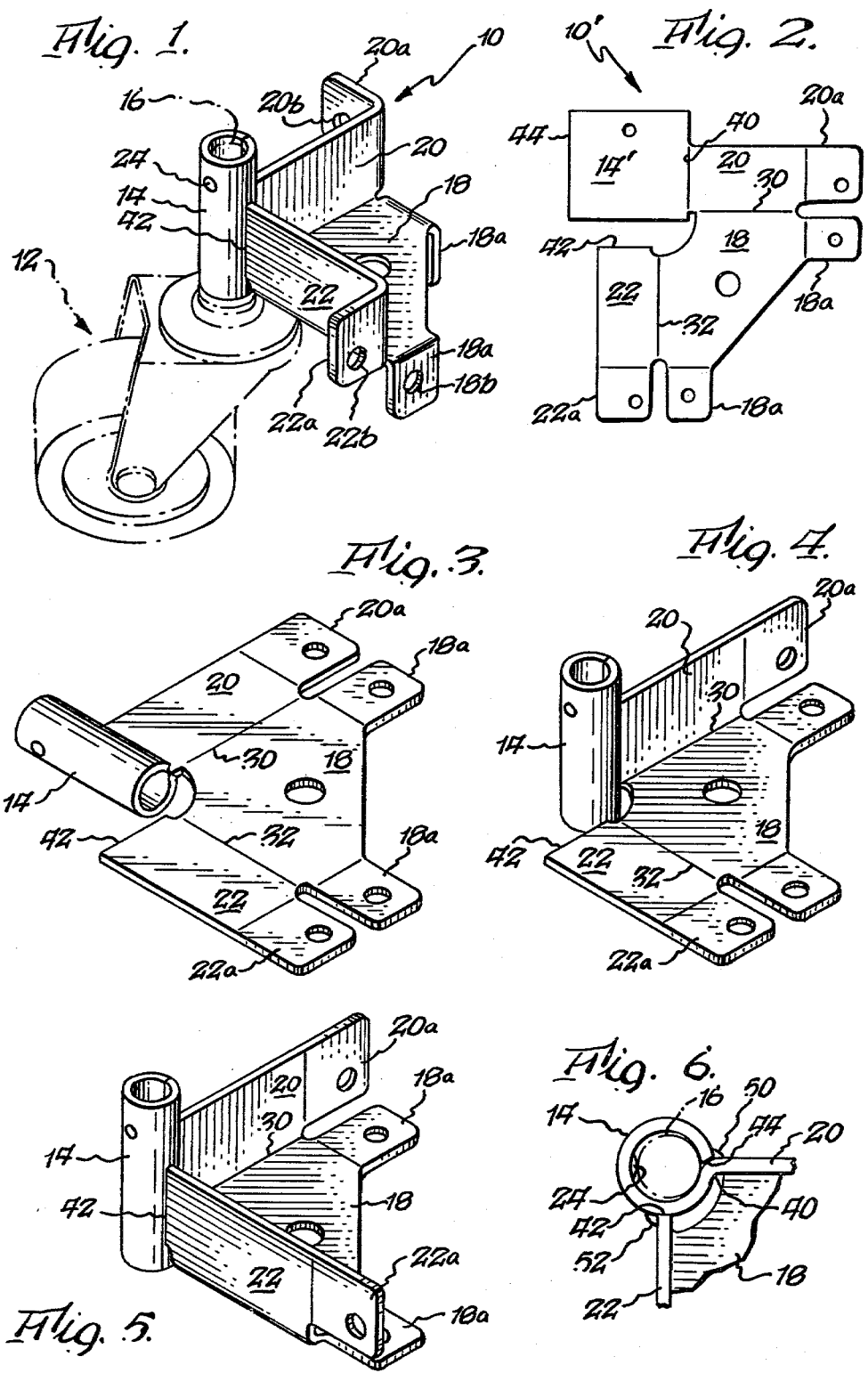

CASTER BRACKET AND METHOD OF FORMING SAME

BACKGROUND OF THE INVENTION

Caster brackets are commonly used in furniture constructions for facilitating the mounting of caster wheels and rollers. Typically, such caster brackets include a tubular sleeve means sized to slidably receive a stud formed as part of a caster assembly and plate means to affix the curl to the base of a piece of furniture. In all prior constructions of which I am aware, it has been necessary to employ a minimum of two separately fabricated metal parts joined to complete the bracket assembly.

SUMMARY OF THE INVENTION

The present invention relates to an improved caster bracket adapted to be fabricated from a single metal stamping.

The caster bracket of the present invention includes a caster stud receiving curl, a pair of side plates and a connecting plate. The side plates are formed integrally with the connecting plate and are arranged in an essentially right angular relationship relative to both each other and the connecting plate, whereas the curl is defined by curling an extension plate formed integrally with one of the side plates. Preferably, a free edge of the extension plate is bonded to its associated side plate, and a free edge of the other side plate is bonded to the curl.

The caster bracket of the present invention possesses cost and strength advantages over the prior multipiece bracket assemblies.

DRAWINGS

FIG. 1 is a perspective view of a caster bracket of the present invention in association with a caster assembly;

FIG. 2 is a plan view of a metal plate from which the caster bracket is adapted to be fabricated;

FIGS. 3-5 are perspective views illustrating various steps, which may be employed in the fabrication of the present bracket from the flat plate shown in FIG. 2;

FIG. 6 is a fragmentary top plan view showing the curl and adjacent side plates.

DETAILED DESCRIPTION

Reference is first made to FIG. 1, wherein an improved caster bracket formed in accordance with the present invention is generally designated as 10 and shown in association with a conventional caster assembly generally designated as 12.

Bracket 10 generally includes a tubular means in the form of a curl 14, which is sized to slidably receive a mounting stud 16 forming a part of assembly 12; and plate means including a connecting plate or portion 18 and a pair of side plates or portions 20 and 22, which serve to mount curl 14 relative to a desired piece of furniture, not shown. Any suitable arrangement may be employed to normally retain stud 16 within curl 14, such as by punch forming the curl to define a dimple 24 arranged to frictionally engage with the stud in the manner best shown in FIG. 6. The size and shape of plates 18, 20 and 22, as well as the mode of attaching same to a piece of furniture, will depend on installation requirements, but for purposes of illustration, these plates are shown as being formed with mounting flanges 18a, 20a and 22a having apertures 18b, 20b and 22b for receipt of suitable fastener devices, not shown.

In accordance with the preferred form of the present invention, bracket 10 is fabricated from a single flat metal blank designed by numeral 10' in FIG. 2.

For purposes of reference, connecting plate 18 is considered as having adjacently disposed side marginal edges 30 and 32 along which it is joined to side plates 20 and 22, respectively. Also, side plates 20 and 22 are considered as having adjacently disposed end marginal edges 40 and 42, which extend at right angles relative to side marginal edges 30 and 32, respectively. Further, blank 10' includes an extension portion or flange 14', which is joined to side plate 20 along end marginal edge 40 and preferably has a free marginal edge 44 disposed essentially parallel to edge 40.

Blank 10' may be formed to define bracket 10 by the forming steps shown, as by way of example in FIGS. 3-5. In FIG. 3, extension 14' is shown as having been shaped to form curl 14, whose axis is disposed essentially parallel to end edge 40. FIGS. 4 and 5 illustrate folding of the blank along side marginal edges 30 and 32 to cause side plates 20 and 22 to upstand in a right angular relationship relative to the upper surface of connecting plate 18 and to position end edge 42 in close proximity or essentially abutting relationship relative to the outer surface of curl 14. Fabrication of bracket 10 may be completed by brazing or otherwise bonding edge 44 to the outer surface of side plate 20 adjacent end edge 40, as indicated at 50, and end edge 42 to curl 14, as indicated at 52. For certain installation requirements, it may not be necessary/desirable to braze edge 44 to side plate 20 for purposes of "closing" curl 14. In this respect, slight springing apart of the walls of an "open" curl may be relied upon to grip stud 16, so as to avoid the need to use dimple 24. This alternative construction would not excessively weaken the bracket, particularly if extension 14' were to be rolled in a direction opposite to that illustrated so as to position edge 44 adjacent the inner surface of side plate 20.

In the preferred construction, side edges 30 and 32 are arranged in a right angular relationship, such that side plates 20 and 22 are disposed at right angles to each other, as well as connecting plate 18, in order to define an extremely strong/stable bracket. Also, in the preferred construction, the elements are sized and arranged such that side plates 20 and 22 lie within planes, which essentially lengthwise bisect curl 14.

The present bracket construction possesses the advantage of being fabricated from a single metal stamping, so as to avoid multi-part assembly techniques common to prior casting brackets. Furthermore, the one piece design of the present bracket, coupled with the joining of edges of the side plates along a substantial extent of the length of the curl and the arrangement of such side plates relative to each other and the connecting plate provides for an extremely strong and rigid assembly.

I claim:

1. In a caster bracket of the type having a tubular means sized to receive a mounting stud of a caster assembly and plate means for attaching said tubular means to a piece of furniture, the improvement permitting the forming of said tubular means and said plate means from a single metal plate, said improvement comprising:

said plate means includes a pair of side plates formed integrally with and arranged to upstand from one surface of a connecting plate along adjacent side edges thereof, said side plates having end edges disposed relatively adjacent one another, said tubular means is a curl formed integrally with and as an extension of one of said side plates along its one of said end edges, said curl having a free marginal edge disposed parallel to and immediately adjacent said one of said end edges of said one of said side plates, said free marginal edge is bonded to said one of said side plates, said curl is lengthwise bisected by each of said side plates, and said curl is bonded to the other of said side plates along its one of said end edges.

2. A method of forming a caster bracket comprising the steps of:

providing a flat metal blank having a connecting portion joined along adjacent side edges to a pair of side portions, said side portions having adjacently disposed end edges, each of said end edges extending in an essentially right angular relationship relative to that one of said adjacent side edges to which its associated one of said side portions is joined to said connecting portion, and an extension portion joined to one of said end edges of one of said side portions, said extension portion having a free marginal edge spaced from said one end edge;

shaping said extension portion to form a curl whose axis is disposed essentially parallel to said one end edge;

folding said blank along said side edges to position said side portions in a right angular relationship relative to said connecting portion, said curl and the other of said end edges being disposed in proximity upon completion of forming of said curl and folding of said blank; and bonding said other of said end edges to said curl.

3. A method according to claim 2, providing the additional step of closing said curl by bonding said free marginal edge to said one of said side portions adjacent said one of said end edges.

* * * * *